United States Patent [19]
Kishi et al.

[11] Patent Number: 4,784,562
[45] Date of Patent: Nov. 15, 1988

[54] APPARATUS FOR CARRYING WORK TO AND OUT OF PRESS

[75] Inventors: Tomomi Kishi; Kosuke Shiramizu; Kanshi Nonami; Masahiko Takeuchi; Takeshige Kurumizawa, all of Toyota, Japan

[73] Assignees: Toyota Jidosha Kabushiki Kaisha; Taiho Seiki KK, both of Aichi, Japan

[21] Appl. No.: 883,918

[22] Filed: Jul. 10, 1986

[30] Foreign Application Priority Data

Jul. 19, 1985 [JP] Japan ............................ 60-159786

[51] Int. Cl.⁴ .................................... B30B 15/30
[52] U.S. Cl. .................................... 414/225; 72/422; 100/215; 414/737; 414/742; 414/917
[58] Field of Search .............. 414/222, 225, 226, 736, 414/737, 735, 742, 749, 751–753, 917; 72/422, 426; 100/215

[56] References Cited

U.S. PATENT DOCUMENTS

| | | | |
|---|---|---|---|
| 3,902,606 | 9/1972 | Rönbeck | 414/737 X |
| 4,077,523 | 3/1978 | Spanke | 414/742 X |
| 4,400,984 | 8/1983 | Rönbeck | 414/752 X |
| 4,400,985 | 8/1983 | Bond | 414/752 X |
| 4,411,587 | 10/1983 | Niki | 414/917 X |
| 4,530,637 | 7/1985 | Mason et al. | 414/737 X |
| 4,574,941 | 3/1986 | Tsuge et al. | 198/468.2 |
| 4,585,389 | 4/1986 | Watanabe et al. | 414/225 X |
| 4,589,819 | 5/1986 | Shirao | 414/225 X |
| 4,634,338 | 1/1987 | Tsuge et al. | 414/917 X |
| 4,648,786 | 3/1987 | Sakurai | 414/736 X |

FOREIGN PATENT DOCUMENTS

| | | | |
|---|---|---|---|
| 61504 | 10/1982 | European Pat. Off. | 414/752 |
| 3928 | 1/1985 | Japan | 414/737 |
| 61-82735 | 5/1986 | Japan . | |
| 1073086 | 2/1984 | U.S.S.R. | 414/917 |

*Primary Examiner*—Robert J. Spar
*Assistant Examiner*—P. McCoy Smith
*Attorney, Agent, or Firm*—Kenyon & Kenyon

[57] ABSTRACT

An apparatus for carrying a workpiece to and out of a press is provided with at least a pair of workpiece carrying mechanism assemblies which are driven and controlled independently, and each of the mechanism assemblies includes at least one attachment for attracting the workpiece.

3 Claims, 4 Drawing Sheets

APPARATUS FOR CARRYING WORK TO AND OUT OF PRESS

BACKGROUND OF THE INVENTION

1. Field of the Invention

The present invention relates to an apparatus for carrying a workpiece to and out of a press and, more particularly, to an apparatus for automatically carrying various workpieces which are to be pressed to a press disposed on a press line which continuously performs a pressing process.

2. Description of the Prior Art

With the automation of production lines, the loading of workpieces to be pressed is automated. On a press line constituted by 5 to 6 presses, an unloader for taking out the pressed workpieces and a loader for supplying workpieces to the press are used. The loader carries a workpiece which has been cut to shape to a press and the unloader carries the workpiece once pressed to another press, and in this manner each part of, e.g., a vehicle is produced through several pressing processes.

In a such a press line as shown in FIG. 3, a conveyor 12 travels between presses 10-1 and 10-2, and an unloader 18 which carries a workpiece 16 from a press die 14-1 of the press 10-1 and a loader 18″ which carries the workpiece 16 into a press die 14-2 of the succeeding press 10-2 are provided. The unloader 18 pulls toward it, holds and places the workpiece 16 on a lift 20-1. The lift 20-1 vertically moved and places the workpiece 16 on the belt conveyor 12 at a predetermined control timing. The workpiece 16 is next held by a lift 20-2 on the side of the succeeding press 10-2. In this way, the workpiece carried from the press 10-1 is supplied to the press die 14-2 by the loader 18′ in the same way as by the unloader 18.

FIG. 4 shows the structure of the loader 18′ (unloader 18). The loader 18′ is provided with an attachment 22 having two arms which hold and carry the workpiece 16. Two attracting means 24-1, 24-2 for holding the workpiece 36, such as magnets, are provided on the forward ends of the two arms, respectively.

The attachment 22 has a certain configuration and length depending on the configuration of a given workpiece in a given pressing design or on a given route of travel, and it is replaced by another attachment every time a different workpiece is to be pressed. The attachment 22 is connected to two parallel links 28-1 and 28-2 through a bayonet fitting 26.

The links 28-1 and 28-2 are pivotally attached to a slide plate 34 which slides on a slide rail 32 (in the direction indicated by the arrow b) on a loader (unloader) body 30. The link 28-1 is pivoted by a rocking arm 38 which engages a drive pin 36. The drive pin 36 is engaged with a cam plate 40 attached to the loader body 30. The cam plate 40 determines the route of travel of the attachment 22 and, hence, the route of travel of the workpiece 16. Thus, the rocking arm 38, which is driven by a drive motor 42, moves the attachment 22 on the route of travel indicated by the arrow 100. The attachment 22 constantly moves on the route which is fixed by the cam plate 40.

The loader 18′ can move in the right and left direction with respect to the press 10-2. The loader body 30 is fixed to a body supporter 44 which is slidable on a longitudinal rail 46 attached to the press 10-1 or the like. A feed screw 50, which is connected to a longitudinal shaft drive motor 48, is engaged with a screw receiver 52 provided on the body supporter 44.

In this way, in the state in which the attachment 22 is movable in the longitudinal direction with respect to the press, the workpiece 16 is inserted into the press 10-1 on the predetermined route of travel 100 to be placed on the press die 14.

However, a conventional workpiece carrying apparatus of this kind is inconvenient in that the attachment 22 having two arms is coupled to the cam plate 40 so that the route of travel, which depends upon the cam plate, cannot be varied. If a workpiece of a particular pressing design is carried such as, for example, when a workpiece 16′ indicated by the broken line in FIG. 4 is carried, the attachment is required to have one arm longer than the other one. In other words, it is necessary to prepare an attachment exclusively for each workpiece having a different configuration and to exchange it every time a workpiece having another configuration is to be pressed.

A high cost is involved in providing many attachments. Furthermore, the operation of changing attachments is troublesome and dangerous because it is conducted by a worker, and it thus constitutes a barrier to complete automation of a press line.

In addition, since the attachment is produced after confirmation by fitting actual parts, if the attachment is deformed by mistake during operation, it takes time to correct and restore the attachment to its original form, thereby making it impossible to immediately resume the operation of the press line.

SUMMARY OF THE INVENTION

Accordingly, it is an object of the present invention to provide an apparatus for carrying a workpiece to and out of a press which is capable of freely setting the route of travel of a workpiece and which does not need many attachments of different configurations depending on the configuration of each separate workpiece.

To achieve this aim, an apparatus according to the present invention is composed of at least two workpieces carrying mechanism assemblies each of which includes an attachment for holding and carrying a single workpiece at separate spaced-apart locations on the workpiece, a mechanism for horizontally moving the attachment in a direction between a workpiece delivery location and a press, and a vertical movement mechanism for moving the attachment in the vertical direction. These workpiece carrying mechanism assemblies individually move the respective attachments in a first horizontal direction to and from the press and in the vertical direction, thereby carrying the workpiece on a desired resultant route of travel.

According to the above-described structure, each attachment can move in the vertical and first horizontal directions on its own route, and, when moving toward a workpiece, each attachment moves to the workpiece on a predetermined route of travel and, after it has taken hold of the workpiece, it moves on a predetermined route of travel to carry the workpiece to the press. Since this operation is performed by each workpiece carrying mechanism assembly, but on an independent path, it is possible to alternatively carry various sizes and shapes of workpieces.

The above and other objects, features and advantages of the present invention will become clear from the following description of the preferred embodiments thereof, taken in conjunction with the accompanying drawings.

DESCRIPTION OF THE PREFERRED EMBODIMENTS

Preferred embodiments of the present invention will be explained here with reference to the accompanying drawings.

Figure 1:
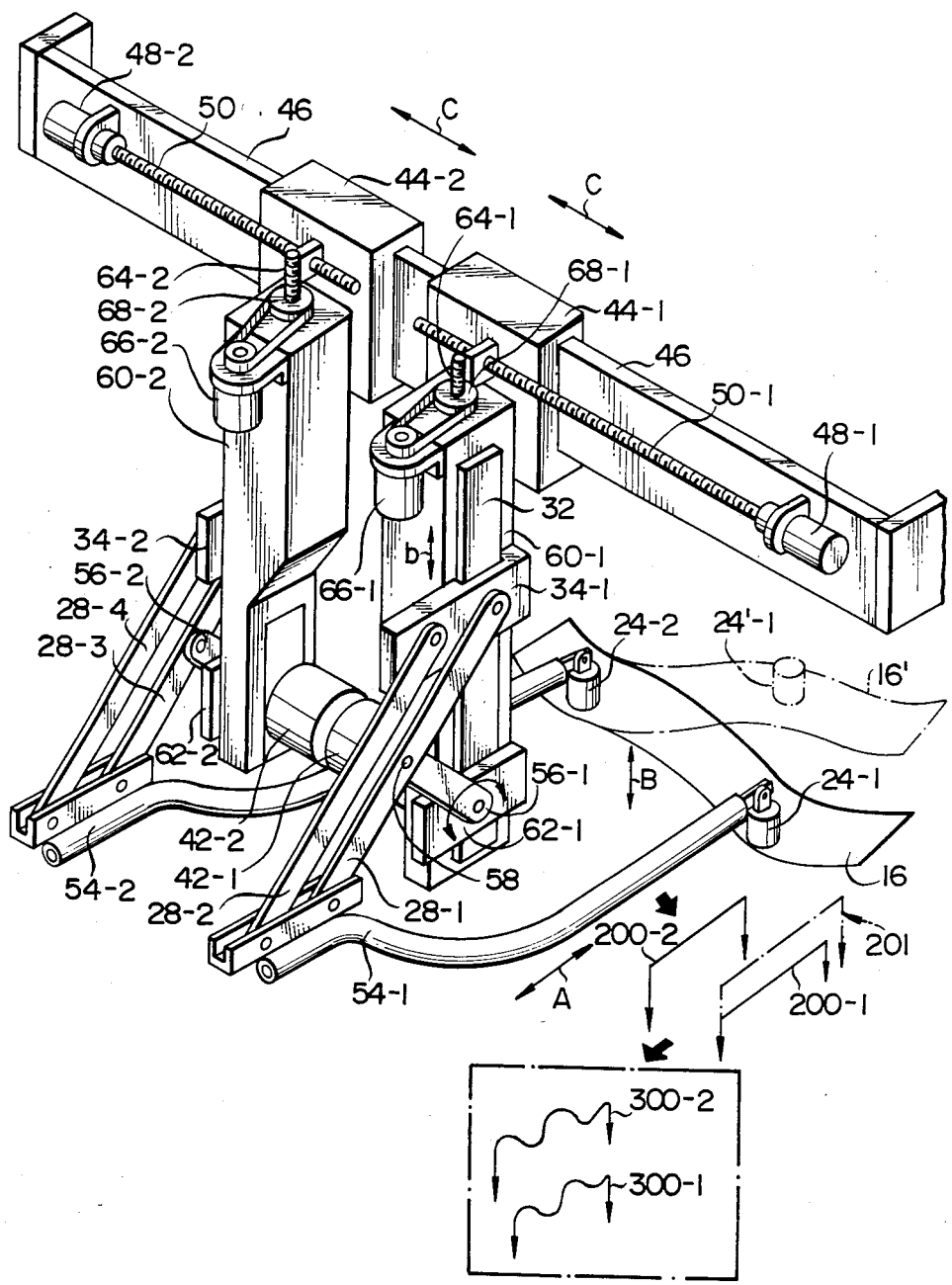
FIG. 1 is a simplified perspective view of a first embodiment of a loader (unloader) as a workpiece carrying mechanism assembly in accordance with the present invention.
Figure 4:
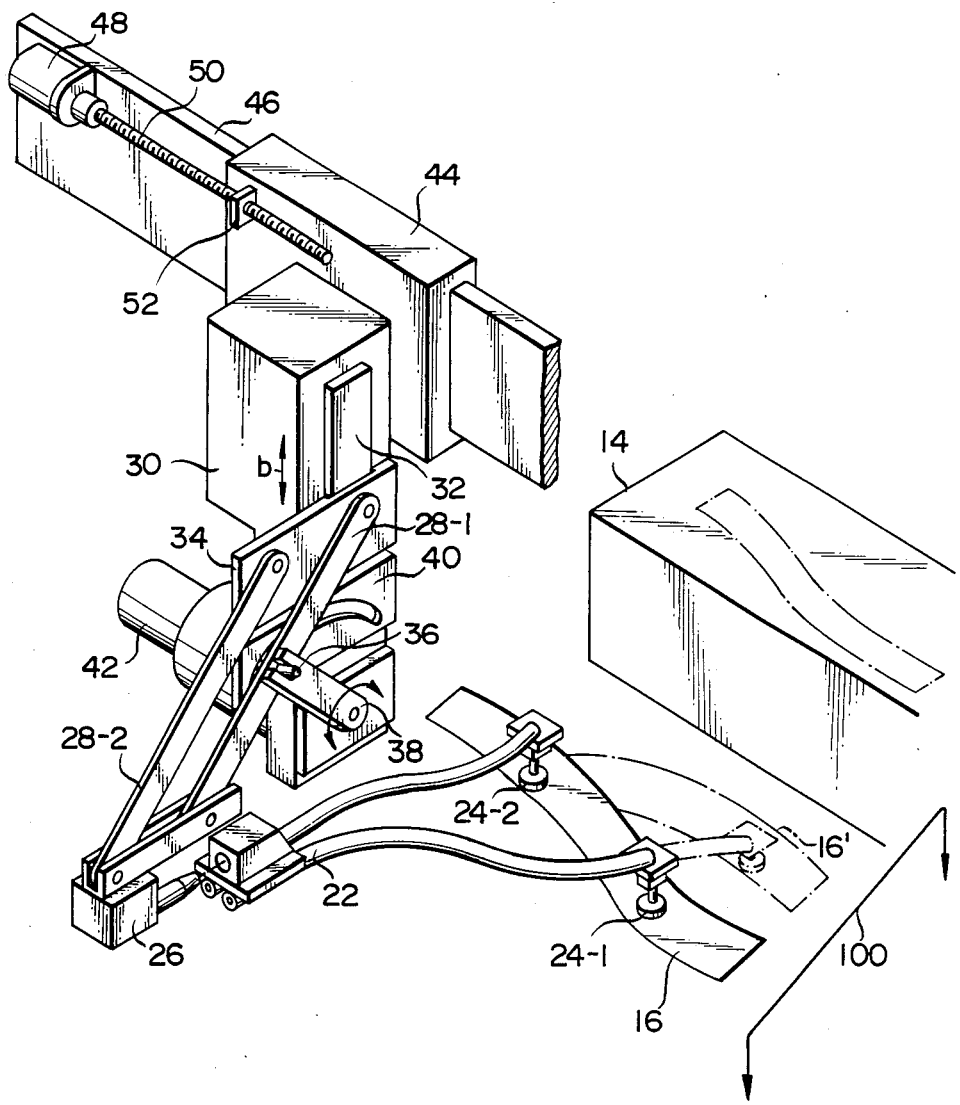
FIG. 4 is a simplified perspective view of a conventional loader (unloader).

Referring first to FIG. 1, a link type workpiece carrying apparatus (loader and unloader) is shown as a first embodiment of the present invention. The same numerals are provided for those elements which are the same as those in the conventional apparatus of FIG. 4, and explanation thereof will be omitted.

An apparatus according to the present invention is characterized in that at least two workpiece carrying mechanism assemblies are provided, each of which is capable of performing biaxial movement of an attachment in a first horizontal direction and in the vertical direction, and in that the biaxial movement is conducted by each mechanism assembly independently of the others. In this embodiment, a pair of loaders are provided as workpiece carrying mechanism assemblies, each of which is provided with an attachment 54-1 or 54-2, a first horizontal movement mechanism consisting of a link mechanism, and a vertical movement mechanism consisting of a screw feed mechanism. This embodiment is further provided with second horizontal movement mechanisms for moving the loaders in a horizontal direction perpendicular to the movement of the first horizontal movement mechanism. As described above, this embodiment is provided with two loaders, and only the loader on the right-hand side, as shown in FIG. 1, is described in detail, for the purpose of simplifying the explanation.

An attachment 54-1 in accordance with the present invention is composed of one arm with an attracting means 24-1 attached to the end thereof. An electromagnet, a vacuum cup or a grip type actuator is usable, for example, as the attracting means 24-1, and in this embodiment an electromagnet is used. The attracting means 24-1 attached to the loader attracts the workpiece 16. The attachment 54-1 is connected to the links 28-1 and 28-2. A first horizontal movement mechanism which includes these links 28-1 and 28-2 moves the workpiece from a pickup location to a press.

The first horizontal movement mechanism is composed of the two links 28-1, 28-2, the slide plate 34-1 which slides on the slide rail 32, a rocking arm 56-1 and the drive motor 42-1 for driving the rocking arm 56-1 via a drive shaft 57-1. The rocking arm 56-1 is rotatably engaged with the link 28-1 by a pin 58. Although the slide rail 32 is fixed to the loader body 60-1, each member constituting the transversely moving mechanism is slidable in the vertical direction of the loader body 60-1 together with a supporting member 62-1 which supports the rocking arm 56-1 and the drive motor 42-1. The supporting member 62-1 is slidable on the slide rail 32.

The first horizontal movement mechanism having the above-described structure produces a type of rectilinear motion in which, when the slide plate 34-1 is vertically moved in the direction indicated by the arrow b by the rocking motion of the rocking arm 56-1, the attachment 54-1 moves horizontally toward and away from the press (not shown).

To describe this in more detail, when the drive motor 42-1 rotates, the rocking link 56-1 rocks. With the rocking motion of the rocking link 56-1, the parallel links 28-1 and 28-2 rock, thereby moving the attachment 54-1 in the first horizontal direction toward and away from the press as indicated by the arrow A. Since the supporting points of both links 28-1 and 28-2 are rotatably supported by the slide plate 34-1 which moves vertically on the slide rail 32, as described above, the attachment 54-1 moves horizontally at a predetermined level.

The vertical movement mechanism is composed of a vertical feed screw 64-1 which engages a nut (not shown) connected to the supporting member 62-1 of the first horizontal movement mechanism, a vertical shaft drive motor 66-1, and a belt transmission system for transmitting the drive force of the motor 66-1. The drive force of the vertical shaft drive motor 66-1 rotates a pulley 68-1 through the belt transmission, thereby rotating the vertical feed screw 64-1 in a clockwise or counterclockwise direction. As a result, the supporting member 62-1 connected to the nut is moved vertically, thereby moving the attachment 54-1 on the vertical route of travel.

The second horizontal movement mechanism is, as in the prior art, provided with a body supporter 44-1 which is slideable on the longitudinal rail 46 which extends in the second horizontal direction and which is attached to the press or the like, such that the longitudinal feed screw 50-1 connected to the longitudinal shaft drive motor 48-1 can move the loader body 60-1 in the second horizontal direction perpendicular to the direction from the loading position to the press.

This embodiment includes two loaders (unloaders) as workpiece carrying mechanism assemblies having this structure. The structural elements of the second loader (unloader) are identical to those of the first and are identified by the same reference numerals, followed by a "-2". The operation of the second unit is the same as described above for the first unit.

The attachments 54-1 and 54-2 are each movable triaxially, namely, in the first horizontal direction indicated by the arrow A, in the vertical direction indicated by the arrow B, and in the second horizontal direction indicated by the arrow C. In a typical operation, the attachments 54-1 and 52-2 move on the routes of travel indicated by the arrows 200-1 and 200-2, respectively. It is also possible for each attachment to take a different route. For example, the attachment 54-1 can move on the route of travel indicated by the broken line 201, whereby the workpiece 16 is carried to the position 16'.

It is also possible to freely set the intermediate routes of travel for the attachments 54-1 and 54-2. For example, the attachments can take the routes indicated by the arrows 300, and thus it is possible to determine the resultant route of travel for carrying the workpiece 16 with a high degree of freedom.

Such a route of travel for the workpiece 16 is determined by a teaching play back system control of the drive motors 42-1, 42-2; 46-1, 46-2; and 48-1, 48-2 for the first horizontal movement mechanisms, the vertical movement mechanisms, and second horizontal movement mechanisms, respectively. By making commands in accordance with the requirements of workpieces having different pressing processes, various workpieces may easily be carried to or out of the press.

Each of the motors uses a servo motor or the like for accurate drive control, and a decelerator is incorporated into the first horizontal movement mechanism drive motors 42-1 and 42-2 for making the workpiece carrying operation smooth.

As described above, since two workpieces carrying mechanism assemblies are provided at a single loading (unloading) position in this embodiment, the load of one workpiece carrying mechanism assembly when carrying a workpiece is lightened in comparison with the prior art loading (unloading) position where only one workpiece carrying mechanism with an attachment having two arms is employed at each workpiece delivery location. Accordingly, the workpiece carrying operation is conducted very quickly, thereby enabling a great contribution to the speed-up of a press line process.

Figure 2:
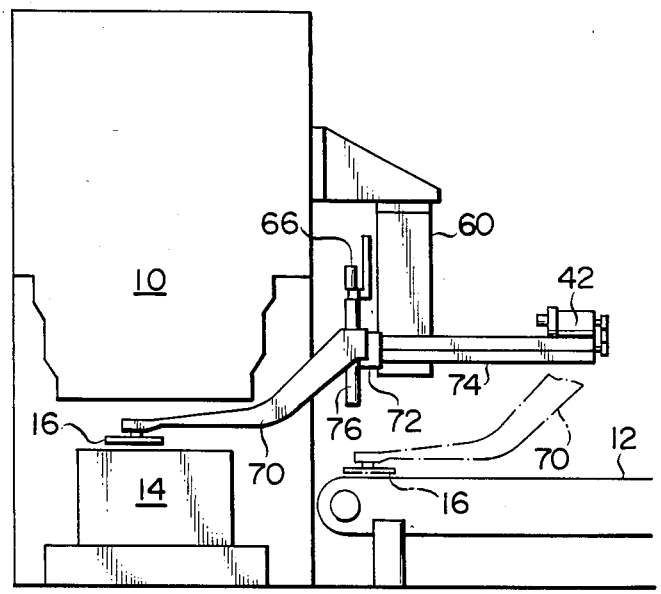
FIG. 2 is an explanatory elevation view of a second embodiment of the present invention.
Figure 3:
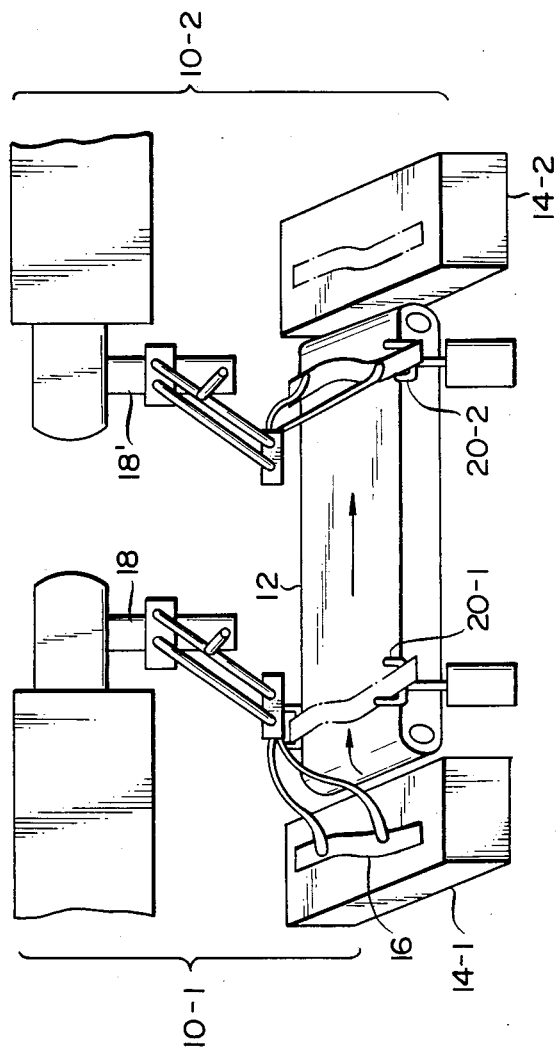
FIG. 3 is a simplified perspective view of workpiece loading and unloading operations on a press line according to the prior art.

FIG. 2 shows a second embodiment of a workpiece carrying apparatus. This embodiment is an orthogonal type unloader.

The first horizontal movement mechanism of this embodiment does not have a link mechanism but has a transverse movement portion 72 which holds an attachment 70 and slides on a slide base 74. The attachment 70 is moved in the first horizontal direction toward and away from the press along the slide base 74 fixed to the unloader body 60. The vertical movement mechanism is so designed as to have the attachment 70 engage with the feed screw of a vertical shaft 76 which is fixed to the transverse movement portion 72, whereby the attachment 70 is vertically moved by the vertical shaft drive motor 66.

The second embodiment also has two workpiece carrying mechanism assemblies of this kind, only one of which is shown in FIG. 2. The pair of workpiece carrying mechanism assemblies hold the workpiece 16 and carry it out of the press for placement on the belt conveyor 12.

As described above, according to the present invention, since at least two workpiece carrying mechanism assemblies are provided which conduct at least biaxial motion in first horizontal and vertical directions independently, it is possible to set a desired resultant route of travel in accordance with the type of pressing workpiece being carried, thereby dispensing with the need for preparing a plurality of attachments corresponding to the number of types of pressing workpieces. Consequently, exhange of attachments is unnecessary, thereby enabling a reduction in the equipment cost.

Furthermore, when a new workpiece is required to be carried in correspondence with a change of design, it suffices simply to instruct the new route of travel. In addition, speed-up of the work carrying operation will greatly contribute to automation of the press line.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An apparatus for carrying a single workpiece between a workpiece delivery location and a press comprising:
    at least two workpiece carrying mechanism assemblies, each of which includes
    an attachment for holding and carrying said workpiece between the workpiece delivery location and said press,
    a first horizontal movement mechanism for horizontally moving said attachment in a first horizontal direction between the workpiece delivery location and said press, and
    a vertical movement mechanism for vertically moving said attachment, said workpiece carrying mechanism assemblies performing biaxial movement of the respective attachments in the first horizontal and vertical directions independently of each other so as to simultaneously carry said single workpiece between the work delivery location and said press on a given route of travel.

2. An apparatus according to claim 1, further comprising a second horizontal movement mechanism for horizontally moving said workpiece carrying mechanism assemblies in a second horizontal direction perpendicular to said first horizontal direction, thereby enabling a workpiece to be carried to and out of said press by movement in three mutually orthogonal directions.

3. An apparatus according to claim 1 or 2, wherein said vertical movement mechanism of each workpiece carrying mechanism assembly includes a supporting portion for supporting said first horizontal movement mechanism, said supportng portion being slidable on a rail provided on a main body of each of said workpiece carrying mechanism assemblies and being moved on said rail by a feed screw.

* * * * *

UNITED STATES PATENT AND TRADEMARK OFFICE
CERTIFICATE OF CORRECTION

PATENT NO. : 4,784,562

DATED : November 15, 1988

INVENTOR(S) : Tomomi KISHI et al.

It is certified that error appears in the above-identified patent and that said Letters Patent is hereby corrected as shown below:

| Column | Line | |
|---|---|---|
| 1 | 24 | Change "In a such" to --In such--. |
| 1 | 31 | Change "moved" to --moves--. |
| 1 | 42 | Change "36" to --16--. |
| 3 | 9 | Change "exemplanatory" to --explanatory--. |

Signed and Sealed this

Eighteenth Day of April, 1989

Attest:

DONALD J. QUIGG

*Attesting Officer*     *Commissioner of Patents and Trademarks*